(12) United States Patent
Breedvelt-Schouten et al.

(10) Patent No.: US 9,934,616 B2
(45) Date of Patent: *Apr. 3, 2018

(54) PROVIDING VOLUME INDICATORS BASED ON RECEIVED IMAGES OF CONTAINERS

(71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,800

(22) Filed: May 1, 2017

(65) Prior Publication Data

US 2017/0236296 A1    Aug. 17, 2017

Related U.S. Application Data

(63) Continuation of application No. 14/882,667, filed on Oct. 14, 2015, now Pat. No. 9,741,172, which is a
(Continued)

(51) Int. Cl.
*G06T 19/00* (2011.01)
*G06K 9/00* (2006.01)
(Continued)

(52) U.S. Cl.
CPC .......... *G06T 19/006* (2013.01); *G02B 27/017* (2013.01); *G06K 9/00375* (2013.01);
(Continued)

(58) Field of Classification Search
None
See application file for complete search history.

(56) References Cited

U.S. PATENT DOCUMENTS 8,345,930 B2    1/2013    Tamrakar et al.
9,460,562 B2    10/2016   Breedvelt-Schouten et al.
(Continued)

FOREIGN PATENT DOCUMENTS

CN    102089236 A    6/2011
WO    2014160065 A3   10/2014

OTHER PUBLICATIONS

Cheredar, T., "This app can measure an entire room—and its contents—by taking a picture with Google Tango hardware (exclusive)," http://venturebeat.com/2014/06/25/this-app-can-measure-an-entire-room . . . (last modified Jun. 25, 2014, 8:54 AM; last accessed Nov. 4, 2014 2:14 PM), 3 pages.
(Continued)

*Primary Examiner* — Hilina K Demeter
(74) *Attorney, Agent, or Firm* — Nicholas D. Bowman (57) ABSTRACT

In order to aid a user in filling a container with a target volume of a substance, an image is received. The image includes a view of the container and a view of a reference object. The reference object has a known dimension. The view of the reference object and the view of the container are then compared with reference to the known dimension. Based on the comparison, a volume of the container is determined. Based on the volume of the container, a volume indicator is provided.

7 Claims, 8 Drawing Sheets

Related U.S. Application Data continuation of application No. 14/592,944, filed on Jan. 9, 2015, now Pat. No. 9,460,562.

(51) Int. Cl.
- *G06K 9/62* (2006.01)
- *G02B 27/01* (2006.01)
- *G06T 7/62* (2017.01)

(52) U.S. Cl.
CPC ....... *G06K 9/00671* (2013.01); *G06K 9/6215* (2013.01); *G06T 7/62* (2017.01); *G02B 2027/014* (2013.01); *G02B 2027/0178* (2013.01); *G06K 2209/03* (2013.01); *G06T 2207/10004* (2013.01); *G06T 2207/10012* (2013.01); *G06T 2207/10028* (2013.01); *G06T 2207/20212* (2013.01)

(56) References Cited

U.S. PATENT DOCUMENTS

| | | | |
|---|---|---|---|
| 2007/0191983 A1 | 8/2007 | Griffits et al. | |
| 2010/0295948 A1 | 11/2010 | Xie et al. | |
| 2013/0038632 A1* | 2/2013 | Dillavou | G06F 3/1431 345/633 |
| 2013/0301901 A1* | 11/2013 | Satish | G01N 21/25 382/134 |
| 2014/0214601 A1 | 7/2014 | Argue et al. | |
| 2014/0253432 A1 | 9/2014 | Ferguson | |
| 2015/0168365 A1 | 6/2015 | Connor | |
| 2015/0209113 A1 | 7/2015 | Burkholz et al. | |
| 2015/0257681 A1 | 9/2015 | Shuster et al. | |
| 2015/0332620 A1* | 11/2015 | Sako | G06F 3/011 345/8 |
| 2016/0203365 A1 | 7/2016 | Breedvelt-Schouten et al. | |

OTHER PUBLICATIONS

"Kitchen Aid Kit Pro—Your Guide to Smart Cooking," Oct. 21, 2012, by Editor in iPhone Apps, 5 pages.

Narumi et al., "Paper Reading #3: Augmented Perception of Satiety: Controlling Food Consumption by Changing Apparent Size of Food with Augmented Reality," CHI 2012, May 5-10, 2012, Austin, TX, 5 pages.

Thurow et al., "A Fast Optical Method for the Determination of Liquid Levels in Microplates," Hindawi Publishing Corporation, Journal of Automated Methods and Management in Chemistry, vol. 2011, Article ID 805153, 6 pgs., doi: 10.1155/2011/805153.

Wang et al., "Liquid-level measurement using a single digital camera," Measurement 42 (2009), pp. 604-610, © 2008 Elsevier Ltd., DOI: 10.1016/j.measurement.2008.10.006.

IBM, List of IBM Patents or Patent Applications Treated as Related, Apr. 28, 2017, 2 pages.

Breedvelt-Schouten et al., "Providing Volume Indicators Based on Received Images of Containers", U.S. Appl. No. 15/791,487, filed Oct. 24, 2017.

IBM, List of IBM Patents or Patent Applications Treated as Related, Oct. 23, 2017, 2 pages.

\* cited by examiner

PROVIDING VOLUME INDICATORS BASED ON RECEIVED IMAGES OF CONTAINERS

BACKGROUND

The present disclosure relates to data processing, and more specifically, providing a user with a volume indicator generated based on images of a container received by a head-mounted display.

Head-mounted displays (e.g., optical head-mounted displays, head wearable devices, head-mounted apparatuses) are becoming increasingly popular. In some configurations, such a device may include a frame that is adapted to be mounted upon the head of a user. Items positioned on or within the frame may include a microphone, a speaker, a camera, a projector, and a reflective surface (e.g. a display) adapted for reflecting, into the eyes of the user, a virtual image projected from the projector. A computer system or portion thereof (e.g., a central processing unit (CPU)) may also be positioned within the frame and may be electrically coupled to one or more of the other parts of the head-mounted display.

In some configurations, head-mounted displays may be configured to provide augmented reality. As used herein, augmented reality may refer to a real-time view of a real-world, physical environment that is supplemented by one or more virtual displays (e.g., computer-generated graphics, virtual images). When providing augmented reality with a head-mounted display, the virtual images projected into the eyes of the user by the display may appear as though they are positioned on top of, or in front, of one or more real-world objects located within the user's field of vision.

SUMMARY

According to some embodiments of the present disclosure, aspects of the disclosure may include a method. As part of the method, an image is received. The image includes a view of a container and a view of a reference object. The reference object has a known dimension. The view of the reference object and the view of the container are then compared with reference to the known dimension. Based on the comparison, a volume of the container is determined. Based on the volume of the container, a volume indicator is provided.

According to some embodiments, aspects of the disclosure may also include a system for aiding a user in filling a container with a target volume of a substance. The system includes a head-mounted apparatus and a camera mounted on the head-mounted apparatus. The camera is configured to capture an image that includes a view of the container and a view of a reference object. The reference object has a known dimension. The system also includes a computer electrically coupled to the head-mounted apparatus. The computer includes a memory and a processor in communication with the memory. The processor is configured to compare the view of the reference object and the view of the container with reference to the known dimension. The processor is further configured to determine, based on the comparison, a volume of the container. The system further includes a reflective display mounted on the head-mounted apparatus. The reflective display is configured to project, based on the volume of the container, a volume indicator.

According to some embodiments, aspects of the disclosure may also include a computer program product for aiding a user in filling a container with a target volume of a substance. The computer program product includes a computer readable storage medium having program instructions embodied therewith. These program instructions are executable by a computer to cause the computer to perform a method. As part of this method, an image is received from a camera. The image includes a view of the container and a view of a reference object. The reference object has a known dimension. The view of the reference object and the view of the container are then compared with reference to the known dimension. Based on the comparison, a volume of the container is determined. Based on the volume of the container, a volume indicator is provided to a head-mounted display.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing, and more specifically, to providing a user with a volume indicator generated based on images of a container received by a head-mounted display. While the present disclosure is not necessarily limited to such applications (e.g., some embodiments may not require head-mounted displays), various aspects of the disclosure may be appreciated through a discussion of various examples using this context.

In some situations an individual may wish to fill a container (e.g., a glass, a mug, a bucket, a sink) with a certain amount of one or more substances (e.g., various liquids or granular solids). In order to obtain an accurate estimate of how much of each substance to add to the container to achieve the target amounts, the individual may be required to use a measuring cup or other secondary container that is specially configured for measuring volume. This may pose difficulties, for example, in situations where a measuring cup is unavailable. In other situations, a measuring cup may be impractical, for example, in a situation where an individual is trying to fill a bathtub with a specific amount of water that is several gallons in volume.

In some embodiments, an individual may be able to fill a container with a target volume (e.g., a user desired volume) of a substance with the aid of a head-mounted display, rather than with the aid of a measuring cup. In such embodiments, certain techniques known to those skilled in the art, such as object recognition, edge detection, and color analysis, may be utilized. Furthermore, in some embodiments, the head-mounted display may aid the individual in filling the container by generating and providing to the individual a volume indicator (e.g., an auditory signal or digital visual overlay) that is configured to help the individual know when the container has been filled with the target volume of the substance. In some embodiments, as used herein, filling a container with a substance may include adding a quantity of a substance to the container even in situations where the container remains only partially full after the addition (e.g., filling a cup half-full with water).

Figure 1:
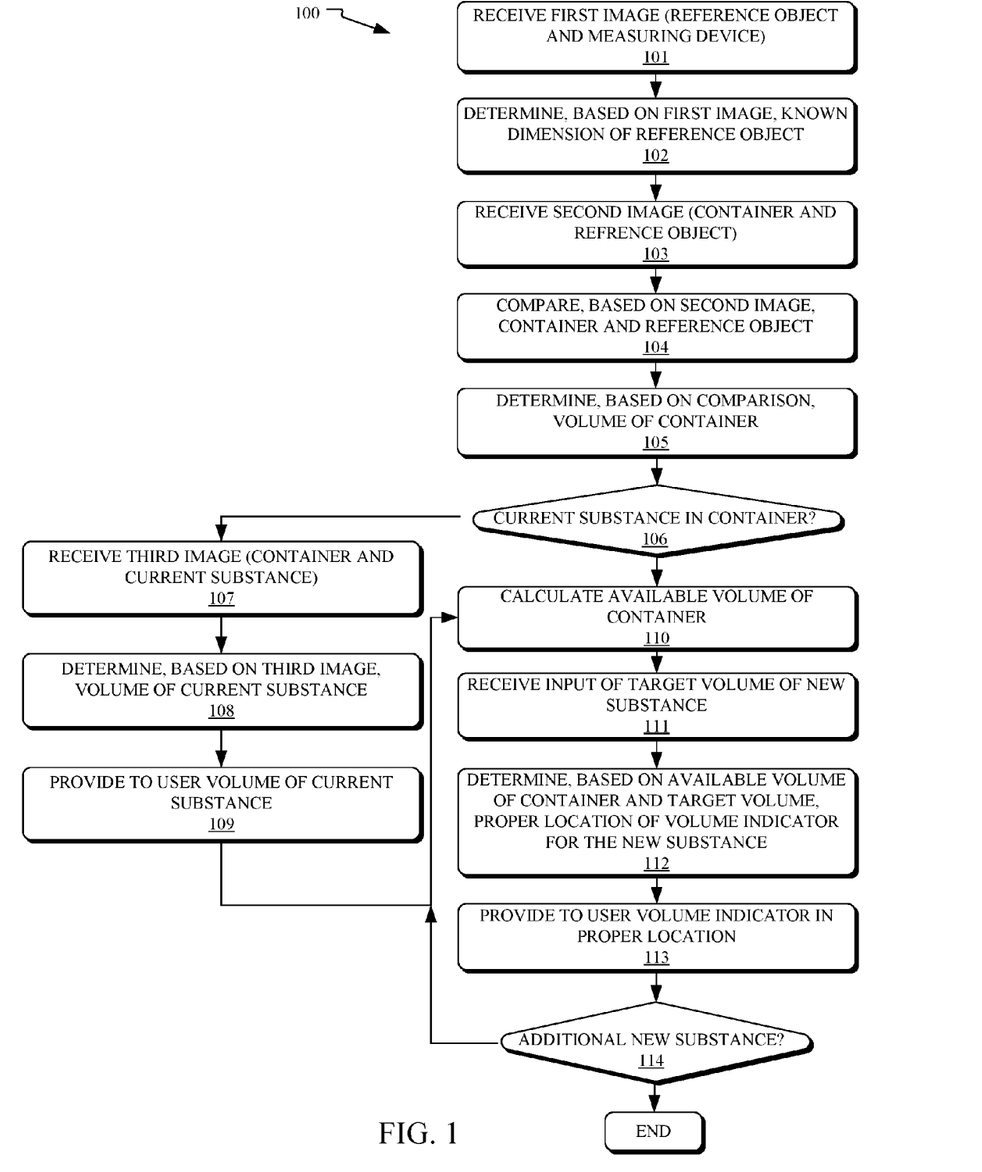
FIG. 1 illustrates a flowchart diagram of an example method for aiding a user in filling a container with a target volume of at least one substance, in accordance with embodiments of the present disclosure.

Referring now to FIG. 1, shown is a flowchart diagram of an example method 100 for aiding a user in filling a container with a target volume of at least one substance, in accordance with embodiments of the present disclosure. In some embodiments, the method may be performed by a head-mounted display that is mounted on the head of the user. Further, the head-mounted display may be electrically coupled to (e.g., it may contain) a computer configured to perform one or more of the operations described in reference to the method 100. The computer may include, for example, the computer 801 described in reference to FIG. 8.

The method 100 may begin at operation 101, wherein a first image is received by the head-mounted display. The first image (or other real-world images described herein) may be received via a camera of the head-mounted display while it is mounted to the head of the user. The first image may be based on a single-frame photograph or based on multi-frame video content. The first image includes both a view of a reference object and a view of a measuring device (e.g., a length measuring tool, such as a ruler). As used herein, a reference object may refer to any object that includes a fixed dimension (e.g., a substantially invariant length, width, or height). In some embodiments, the reference object may be a human appendage or a portion of a human appendage (e.g., arm, hand, thumb, finger). Using an appendage may have the advantage of always being available to the user at the time a reference object is necessary.

Per operation 102, the computer of the head-mounted display identifies, based on the first image, a known dimension of the reference object. More specifically, the known dimension may be identified by comparing length markers on the length measuring tool with the fixed dimension of the reference object in order to determine the value (e.g., length) of the fixed dimension. Once the known dimension of the reference object is identified, the reference object can then be used as a reference for obtaining other measurements of other objects.

In some embodiments, rather than performing operations 101 and 102, a known dimension of a reference object may be determined in other ways. For example, the reference object may itself be a length measuring tool. For another example, the reference object may be measured manually by the user and then the known dimension may be input into the computer directly rather than requiring image-based calculations by the computer to determine the known dimension.

In operation 103, a second image is received by the head-mounted display. The second image includes both a second view of the reference object and a view of the container to be filled by the user. In some embodiments, the second image may be taken from the same location or a different location relative to the first image. In operation 104, with reference to the known dimension, the second view of the reference object and the view of the container are compared by the computer. In operation 105, the computer determines, based on the comparison, the volume of the container. In some embodiments, operations 104 or 105 may include obtaining multiple pixel measurements from the second image, as described in more detail herein. Furthermore, in some embodiments, the computer may be able to determine the shape of the container by making certain presumptions about the container. For example, based on a view of a container that shows that half of the container is cylindrical, the computer may presume that the container is symmetrical and, therefore, that the whole container forms a full cylinder.

In some embodiments, multiple images (rather than the single second image) may be received and analyzed by the computer as part of the determining the volume of the container. By relying on multiple images having multiple views of the container and/or multiple views of the reference object, the computer may be better able to determine such matters as the shape of the container and the relative sizes of the container and the reference object. This, in turn, may allow the computer to output a more accurate value for the volume of the container.

In operation 106, a determination is made as to whether there is any substance that is currently in the container (e.g., a small quantity of liquid that the user has already added to the container). This determination may be made, for example, using edge detection and color analysis techniques in order to identify areas within the container that have a darker shade than the remainder of the container (e.g., with the darker-shaded portion corresponding to the current substance in the container). If a determination is made that there is a current substance in the container, then, per operation 107, a third image is received by the head-mounted display. The third image includes a second view of the container and a view of the current substance. In operation 108, the volume of the current substance is determined, by the computer of the head-mounted display, based on the third image. In some embodiments the volume of the current substance may be calculated by comparing the relative heights of the top surface of the current substance and of the container. For example, in a scenario where a user is using a head-mounted display to determine how much water (current substance) is in a cylindrical kitchen sink (container), the computer of the head-mounted display may calculate the volume of the water by first determining that the height of the top surface of the water in the sink is half of the height of the sink itself. Then the computer may multiply (based on this relative height determination) the known volume of the sink by one-half in order to obtain the volume of the water in the sink. In operation 109, the volume of the current substance in the container is provided by the head-mounted display to the user. This may occur, for example, via an auditory output from a speaker of the head-mounted display into the ear of the user.

In operation 110, the computer determines the available volume (e.g., unused and unallocated portion) of the container. If, per operation 106, the computer determines that there is no substance currently in the container, then the available volume of the container is equal to the entire volume of the container. If, however, there is a current substance in the container, then in operation 110 the computer may calculate the available volume of the container by subtracting the volume of the current substance (as determined in operation 108) from the volume of the container (as determined in operation 105).

In operation 111, the computer receives an input of the target volume of the new substance to be added to the container. This may occur, for example, when the user states the target volume of the new substance into a microphone of the head-mounted display. In operation 112, the computer determines, based on the available volume of the container and the target volume of the new substance, the proper location of a volume indicator for the new substance. In operation 113, the head-mounted display provides the properly-located volume indicator to the user. This may occur, for example, when the display of the device provides to the eye of the user a virtual fill-line superimposed on a wall of the container. The virtual fill-line may be positioned at a height to which the new substance will reach when the target volume of the substance has been added to the container. The properly-located volume indicator may also include, for example, an aural volume indicator, such as a beep from a speaker of the head-mounted display that is timed to go off when the proper volume of the substance is added to the container.

In operation 114, a determination is made as to whether the user desires to add more new substances to the container. For example, the user may want to add both a certain quantity of tomato juice (first new substance) and a certain quantity of carrot juice (second new substance) to the container in order to make a juice mix. If another substance is to be added to the container, then operation 110-113 are repeated. Specifically, a new available volume of the container is calculated (per 110), an input of a second target volume of the second new substance is received (per 111), a proper location of a second volume indicator is determined (per 112), and the second volume indicator is provided to the user (per 113). Once there are no further new substances to be accounted for, the method 100 terminates. In some embodiments, many different new substances may be added to a container and, accordingly, many volume indicators may need to be provided to the user.

While an embodiment of the method 100 is provided herein, many other variants on method 100 are possible. For example, in some embodiments, a single image (rather than two separate images) may be used in determining both the volume of a container and the volume of a substance currently in the container. Furthermore, in some embodiments, the target volume of a substance to be added to a container may not be known to the user as a particular volume per se. For example, if the user is filling a three-gallon bucket with water, the user may indicate that his target volume of water is one-third of volume of the container rather than indicating (or even knowing) that this target volume is equal to one gallon of water.

Furthermore, in some embodiments of method 100, a volume indicator provided to a user may not be based on the user's desired volume at all, but rather it may be based only on the volume of the container. For example, upon calculating that a particular container is twelve ounces in volume, a head-mounted display may provide the user with a volume indicator that consists of three lines superimposed on the container wall, with one line to indicate each of three ounces, six ounces, and nine ounces. This particular volume indicator may be provided to the user regardless of the amount of the substance that the user intends to add to the container. Thus, if the user desires to add four ounces of a substance to the container, then some amount of estimation may be needed on the user's part.

Furthermore, in some embodiments of method 100, a head-mounted display could be used not only as an aid for filling up a container, but also as an aid for pouring out of the container. For example, if a user has an eight ounce cup filled to the top with water, the head-mounted display could be used to provide a virtual visual display that indicates the level to which the water's surface would need to be lowered in order to reach a desired amount of water (e.g., six ounces) in the container. The user could then pour water out of the container until the proper level is reached.

Furthermore, in some embodiments of method 100, a head-mounted display could also be used to determine the speed at which a user is filling a container and could provide a warning if the user is pouring into the container too quickly. Such a speed determination could be made, for example, by calculating the change in the volume of the substance being added to the container over a short, fixed period of time.

To aid understanding, an example scenario of method 100 being utilized is provided herein. In this scenario, an individual has received a bouquet of flowers from a friend. The individual learns from a gardening book that the flowers will last longer if a quarter teaspoon of bleach is added per quart of water provided to the bouquet. The user only has a half teaspoon of bleach on hand, so she only wants to add two quarts of water to a vase.

The user puts on her head-mounted display and gets out a ruler and a cube-shaped vase. She begins method 100 by extending her index finger and placing it against the side of the ruler. A camera of the head-mounted display is turned on facing the index finger. The camera captures an image including a view of the index finger and a view of the ruler (per operation 101). Through object recognition techniques, a computer of the head-mounted display recognizes the shape of the index finger and the shape of the ruler in the image. Using the marks on the ruler, the computer determines that the length of individual's index finger is 2.5 inches (per operation 102). Once the length is determined, a speaker of the head-mounted display beeps to let the individual know that the known dimension of the reference object (i.e., length of the finger) has been determined.

Next, the individual moves the extended index finger against an edge of the cube-shaped vase and aims the camera at this scene. The camera captures a second image (per operation 103). The second image includes a view of the vase and a second view of the extended index finger, which are both recognized by the computer. The speaker of the head-mounted display beeps once more, this time letting the individual know that the second image has been received and the individual can remove her index finger from the vase.

The computer then compares the view of the vase and the second view of the index finger within the second image (per operation 104). More specifically, the computer determines, in pixels, the length of the second view of the extended index finger and the length of the view of the vase edge against which the finger is extended. In this scenario, the length of the second view of the finger is determined to be about 500 pixels and the length of the view of the vase edge is determined to be about 1200 pixels. Based on the known length of the index finger (2.5 inches), the computer calculates that an inch is equal to about 200 pixels. Using this conversion factor, the computer next calculates that the length of the vase edge is about 6 inches. The computer then, by recognizing that the vase is cube-shaped, determines the volume of the vase is about 216 cubic inches (per operation 105). The computer also recognizes from the second image that the vase is dry and empty (per operation 106) and that the full volume of the vase is, therefore, available to be filled with a new substance by the individual (per operation 110).

Once the volume of the cube-shaped vase is known, the device speaker states a request of "How much liquid would you like to add?" into the individual's ear. The individual responds by stating "two quarts" into the device microphone (per operation 111). The computer then calculates that two quarts is equal to about 116 cubic inches, meaning that the volume of the water will be about 54% of the volume of the vase, and, therefore, that the water-level will reach about 3.2 inches up the walls of the vase once the two quarts are added (per operation 112).

The device speaker states that the individual can begin adding liquid to the vase. The individual moves the vase into her sink, aims the device's camera at the vase, and begins adding water with a faucet. The computer continues to monitor (using images from the camera), the height of the water within the vase. Once the height of 3.2 inches is reached by the top surface of the water, the device speaker beeps one last time (per operation 113), and the individual responds by turning off the faucet. The individual then indicates that they do not want to get measurements for any additional substances (per operation 114). The individual then safely adds the half teaspoon of bleach to the two quarts of water and places the bouquet in the vase. This completes the project.

It is noted that in the above scenario, the example method 100 is performed without requiring any visual perception from the individual preparing the vase. The individual needs to rely only on her touch and on auditory cues from her head-mounted display in order to complete the project. Based on this example, it becomes clear that some embodiments of the present disclosure could be used to aid visually-impaired individuals in filling containers with target volumes of substances.

Figure 2:
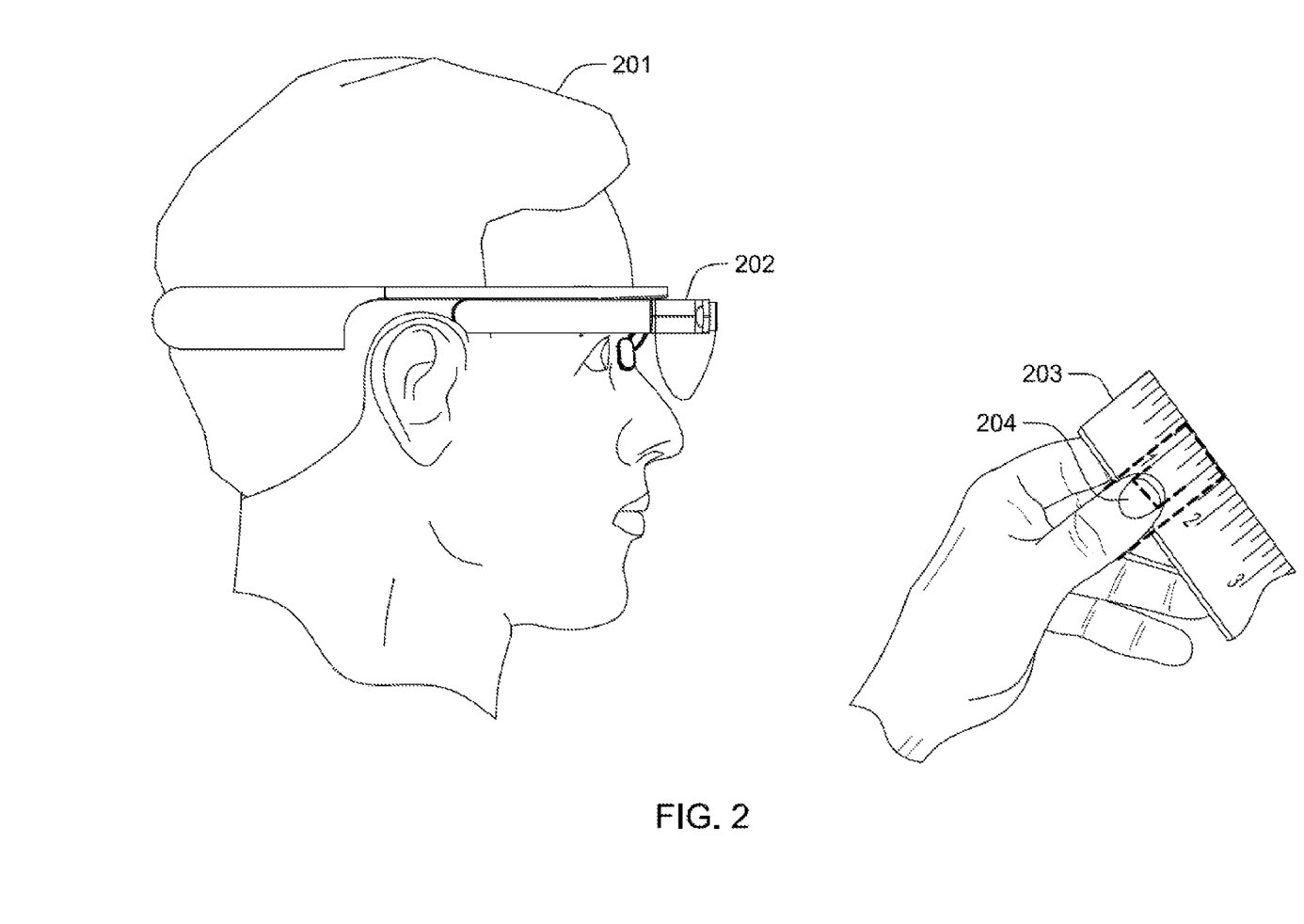
FIG. 2 illustrates a diagram depicting an individual using a head-mounted display to obtain a width measurement of a reference object, in accordance with embodiments of the present disclosure.

Referring now to FIGS. 2-6, described is an example of an embodiment of the present invention being utilized to aid a barista in filling a mug with a caffè latte drink order. In this example, the barista is a new hire at a coffee shop who is using a head-mounted display to aid in learning how to properly make the drinks on the coffee shop's menu. Referring now to FIG. 2 specifically, shown is the barista 201 beginning his first day of training by donning the head-mounted display 202. He uses the head-mounted display 202 to measure the width of his thumbnail 204 by measuring it against a ruler 203. This measurement is captured by a camera of the head-mounted display 202. Based on this exercise, a computer of the head-mounted display 202 is able to use the width of the barista's thumbnail 204 (one-half inch in this instance) as a base measurement (e.g., a known measurement of a reference object) for use in future measurements of other objects within the coffee shop.

Figure 3:
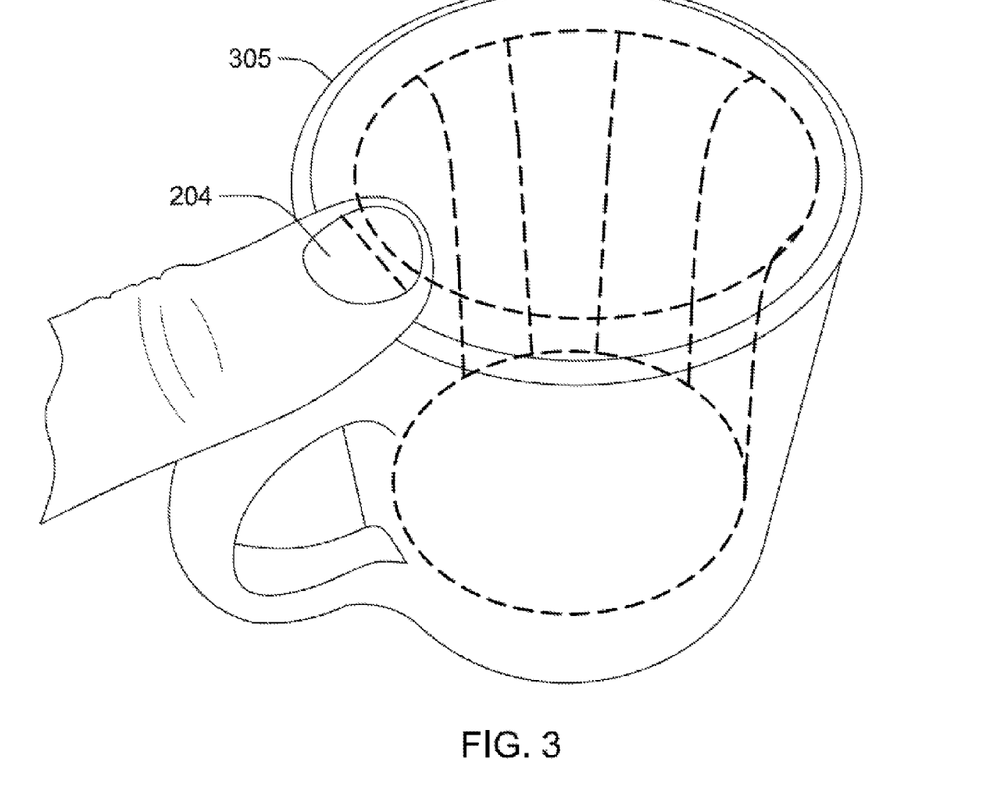
FIG. 3 illustrates a diagram depicting the individual of FIG. 2 using the reference object to obtain a volume measurement of a container, in accordance with embodiments of the present disclosure.

Referring now to FIG. 3, as part of his training, the barista 201 grabs a small mug 305 from the shelf and holds it out in front of the camera of his head-mounted display 202. The computer recognizes the mug 305 and the barista's thumbnail 204. Based on the relative size of the mug 305, the relative width of the thumbnail 204, and the actual width of the thumbnail 204 (i.e., one-half inch), the computer calculates the volume of the mug 305 as five ounces. This information is then stored for future use by the barista.

Figure 4:
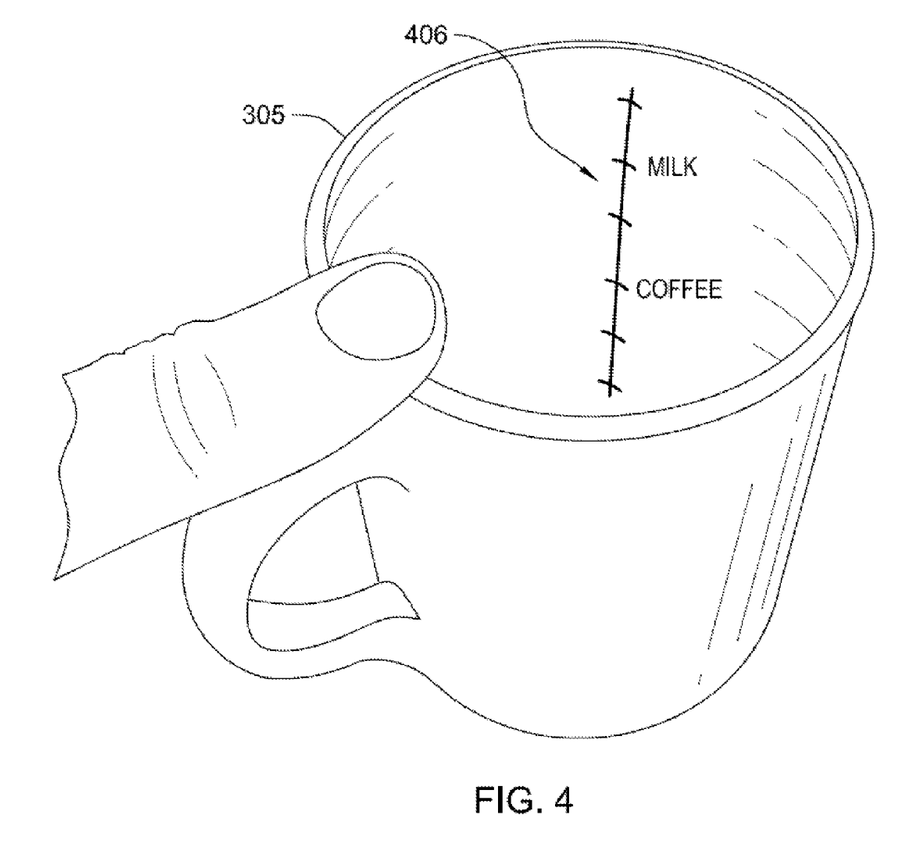
FIG. 4 illustrates a diagram depicting the head-mounted display providing to the individual a virtual visual display superimposed on the container of FIG. 3, in accordance with embodiments of the present disclosure.

Referring now to FIG. 4, the barista 201 receives an order for a small caffè latte from a coffee shop customer. The barista picks up the small mug 305 and, once again, places the mug 305 in front of the camera. The barista then asks the head-mounted display 202 for "small caffè latte". A microphone of the head-mounted display 202 picks up the request and retrieves information about the small caffè latte from its coffee shop drink database. From the database, the computer learns that small caffè latte requires three ounces of coffee and one ounce of milk. The computer then recognizes the small mug 305 and recalls that it has a volume of five ounces. Based on the relative volumes of the mug 305 (five ounces), the coffee (three ounces), and the milk (one ounce), an augmented reality display is provided to the barista 201. More specifically, the computer generates, and a reflective display of the head-mounted display projects, a virtual visual overlay 406 onto the mug 305. As shown, the virtual visual overlay 406 includes several horizontal fill lines. One of the lines is labeled as "coffee" and the top line is labeled with "milk".

Figure 5:
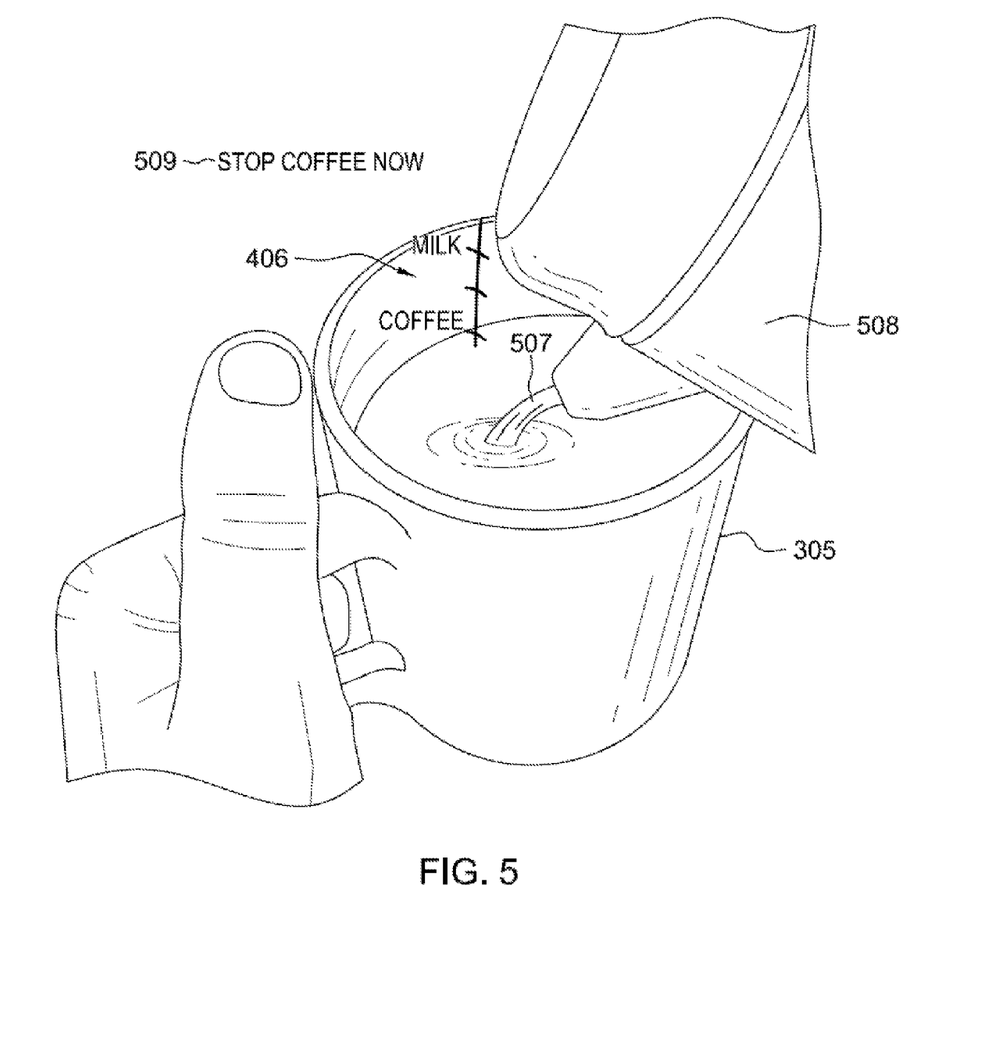
FIG. 5 illustrates a diagram depicting the head-mounted display providing the individual with an additional visual indicator (in addition to the virtual visual display of FIG. 4) in order to inform the individual that a target volume of a first substance has been added to the container, in accordance with embodiments of the present disclosure.

Referring now to FIG. 5, the barista begins pouring coffee 507 from a coffee carafe 508 into the mug 305. The head-mounted display 202 tracks the level of the coffee 507 in the mug 305. Once three ounces of coffee 507 has been added, an additional visual indicator 509 (e.g., a second virtual visual overlay) is provided to the barista 201 by the reflective display. The additional visual indicator 509 includes the words "STOP COFFEE NOW". Upon seeing the additional visual indicator 509, the barista 201 stops pouring the coffee 507.

It is noted that in FIG. 5 the location on the mug 305 of the virtual visual overlay 406 has shifted more to the barista's left relative to its location on the mug 305 in FIG. 4. This may occur in response to the vantage point of the barista 201 likewise moving as he has slid around his workstation. More specifically, the computer of the head-mounted display 202 may recognize the movement by the barista and shift the location of the virtual visual overlay 406 accordingly, so as to ensure that the virtual visual overlay stays in a usable location on the mug 305.

Figure 6:
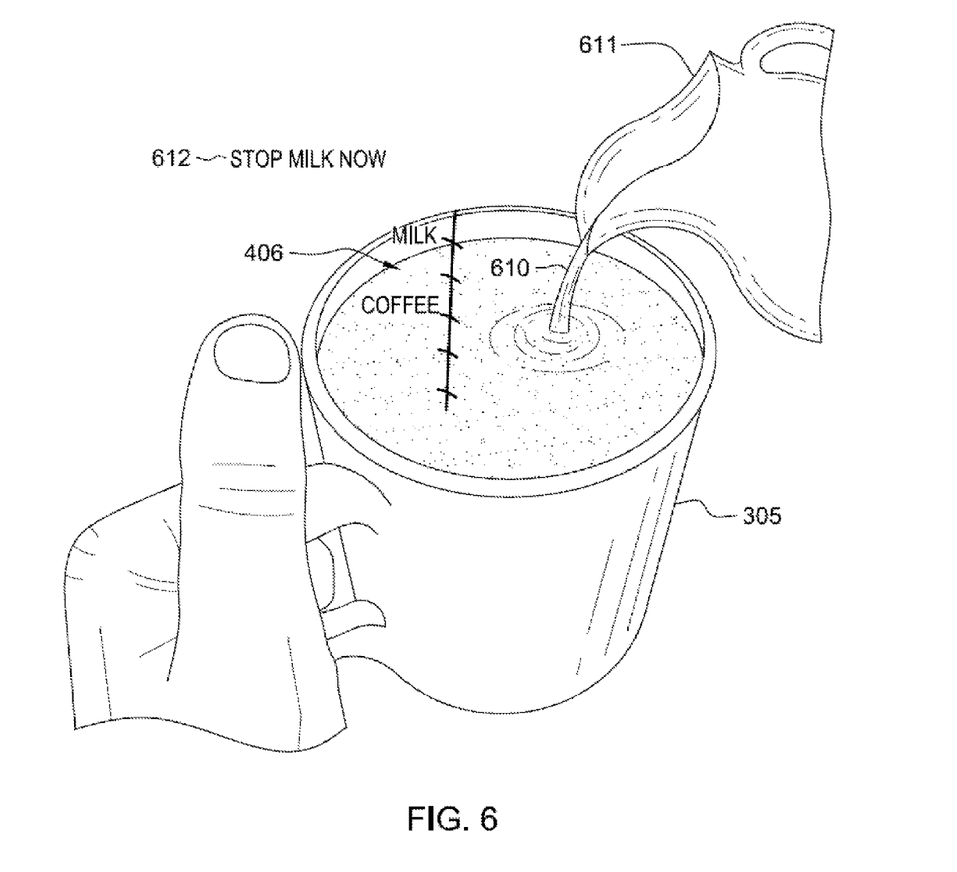
FIG. 6 illustrates a diagram depicting the head-mounted display providing the individual with a second additional visual indicator in order to inform the individual that a second target volume of a second substance (in addition to the first substance added in FIG. 5) has been added to the container, in accordance with embodiments of the present disclosure.

Referring now to FIG. 6, the barista 201 picks up a milk carafe 611 and begins pouring milk 610 into the mug 305 on top of the coffee 507. The head-mounted display 202 tracks the level of milk 610 in the mug 305. Once one ounce of milk 610 has been added, a second additional visual indicator 612 is provided to the barista 201 by the reflective display. The second additional visual indicator 612 includes the words "STOP MILK NOW". Upon seeing the second additional visual indicator 612, the barista 201 stops pouring the milk 610. The barista 201 then provides the small caffè latte to the customer.

It is contemplated that in some embodiments where a head-mounted display is used for training purposes (such as in the barista example above), the goal may be to have the trainee use the head-mounted display for only a short period of time to help learn how to complete one or more container filling tasks. After that, the user would be expected to have learned enough from the device to be able to fill proper amounts without the aid of a head-mounted display.

Figure 7:
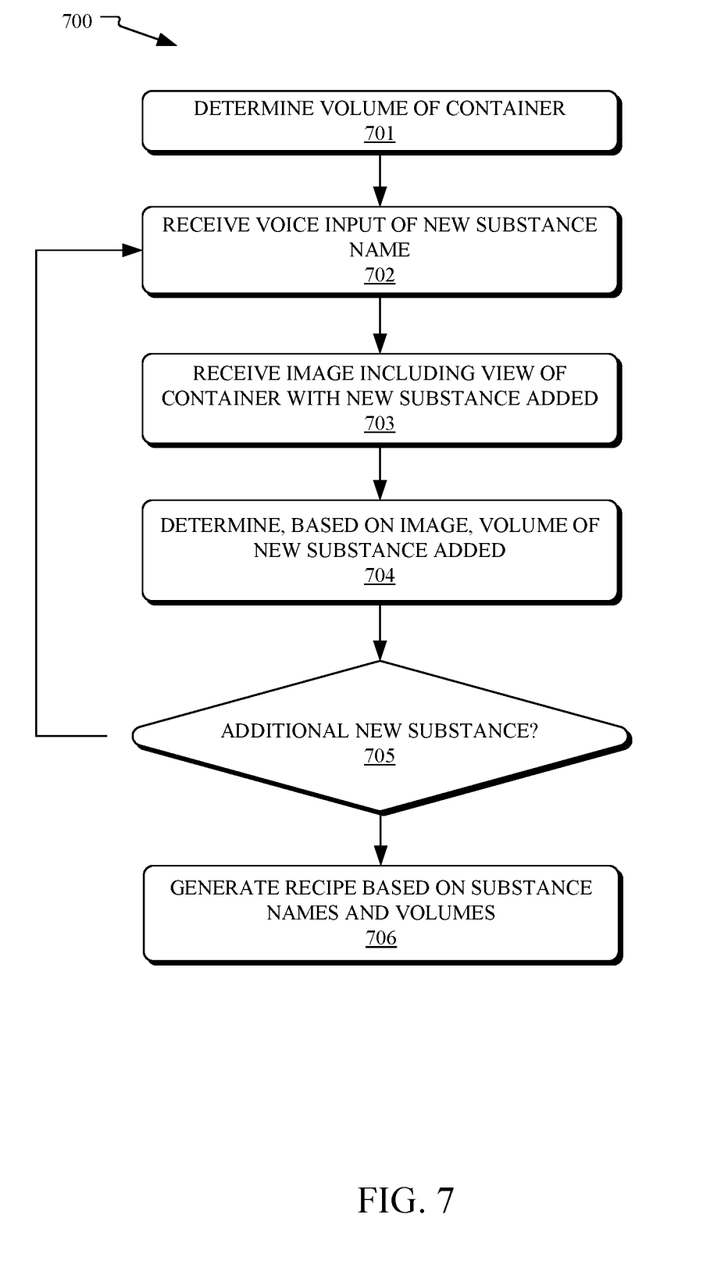
FIG. 7 illustrates a flowchart diagram of an example method for aiding a user in recording a new mixture recipe for subsequent reuse, in accordance with embodiments of the present disclosure.

Referring now to FIG. 7, shown is a flowchart diagram of an example method 700 for aiding a user in recording a new mixture recipe for subsequent reuse, in accordance with embodiments of the present disclosure. This method may be useful, for example, when a user is experimenting with a new mixture of substances and does not know the amount of each substance he is adding to the mixture. Without creating an accurate record of the amounts of each substance added, however, it may be difficult to recreate the recipe later. In some embodiments, the method 700 may be performed by a laptop computer including a camera, a monitor, and a microphone. The method 700 may begin with the laptop determining, per operation 701, the volume of a container to be used in creating the recipe. In some embodiments, this may involve performing, with the laptop, operations 101-105 of method 100 of FIG. 1. The user may then place the empty container in front of the laptop's camera. Per operation 702, the laptop's microphone may receive the name of the first substance to be added from the user. Per operation 703, once the first substance is added to the container, the laptop's camera may capture an image including a view of the container with the first substance in it. Per operation 704, the laptop may determine based on the image and the known volume of the container, the volume of the first substance that was added. Next, per operation 705, a determination is made as to whether any additional substances are to be added to the mixture in the container. For each additional substance that is added operations 702-704 are repeated. Once all of the applicable substances are added, the laptop generates, per operation 706, a recipe including the names and volumes of each substance added to the mixture. In some embodiments, this recipe may be printed out and used by others to recreate the mixture created by the user. Further, in some embodiments, the recipe may be used as the basis for performing method 100 of FIG. 1. For example, a head-mounted display that receives the recipe generated according to method 700 may use the recipe to provide a volume indicator on a different container so that a different user can repeat the process and recreate the mixture.

Figure 8:
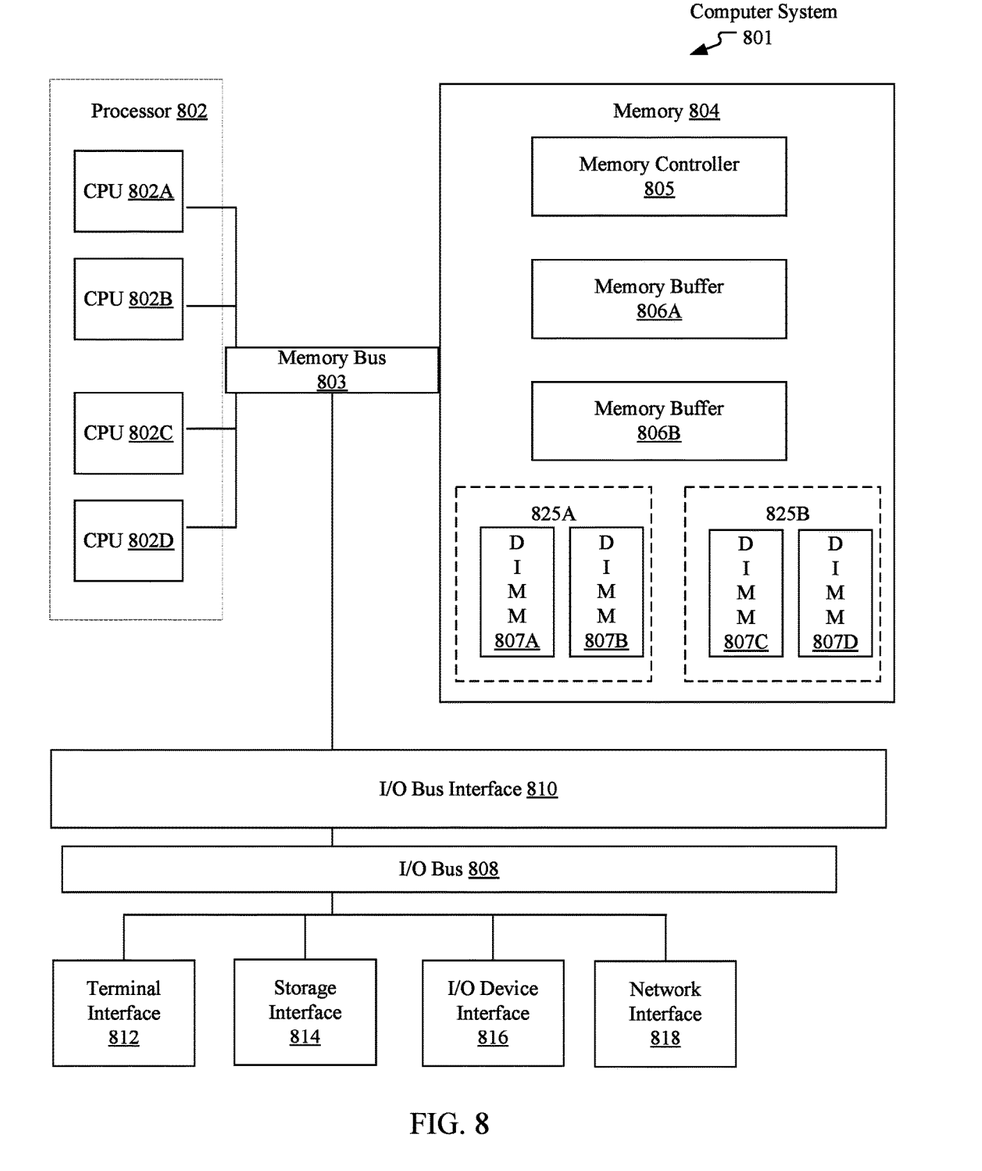
FIG. 8 illustrates a high-level block diagram of an example computer system that may be used in implementing one or more of the methods, tools, and modules, and any related functions or operations, described herein, in accordance with embodiments of the present disclosure.

Referring now to FIG. 8, shown is a high-level block diagram of an example computer system (i.e., computer) 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 814, an I/O (Input/Output) device interface 816, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may comprise one or more levels of on-board cache.

In some embodiments, the memory subsystem 804 may comprise a random-access semiconductor memory, storage device, or storage medium (either volatile or non-volatile) for storing data and programs. In some embodiments, the memory subsystem 804 may represent the entire virtual memory of the computer system 801, and may also include the virtual memory of other computer systems coupled to the computer system 801 or connected via a network. The memory subsystem 804 may be conceptually a single monolithic entity, but, in some embodiments, the memory subsystem 804 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 804 may contain elements for control and flow of memory used by the CPU 802. This may include all or a portion of the following: a memory controller 805, one or more memory buffers 806A and 806B and one or more memory devices 825A and 825B. In some embodiments, the memory devices 825A and 825B may be dual in-line memory modules (DIMMs), which are a series of dynamic random-access memory (DRAM) chips 807A-807D (collectively referred to as 807) mounted on a printed circuit board and designed for use in personal computers, workstations, and servers. The use of DRAMs 807 in the illustration is exemplary only and the memory array used may vary in type as previously mentioned.

Although the memory bus 803 is shown in FIG. 8 as a single bus structure providing a direct communication path among the CPUs 802, the memory subsystem 804, and the I/O bus interface 810, the memory bus 803 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail below, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a head-mounted display configured to be mounted upon a head of a user, an image, the image including a view of a container and a view of a reference object, the reference object having a known dimension;
   comparing, with reference to the known dimension, the view of the reference object and the view of the container;
   determining, based on the comparing, a volume of the container; and
   displaying, by the head-mounted display and based on the volume of the container, a volume indicator, wherein the volume indicator is a virtual visual overlay superimposed on the container, wherein the virtual visual overlay includes a horizontal fill-line superimposed on a wall of the container, the horizontal fill-line configured to indicate a height to which a substance will reach when the container has been filled with a target volume of the substance by the user, and wherein, as displayed, the virtual visual overlay superimposed on the container is superimposed such that a majority of the container remains unobscured by the volume indicator.

2. The method of claim 1, wherein the volume indicator is configured to aid the user in filling the container with the target volume of the substance.

3. The method of claim 1, wherein the reference object is a portion of an appendage of the user, the method further comprising:
   identifying the known dimension by obtaining a measurement of the portion the appendage.

4. The method of claim 3, wherein the measurement of the portion of the appendage of the user is a width of a thumbnail of the user.

5. The method of claim 1, further comprising:
   receiving a second image, the second image including a second view of the container filled with a quantity of the substance;
   determining, based on the second image, a volume of the quantity of the substance; and
   providing the volume of the quantity of the substance to the user.

6. The method of claim 1, wherein the determined volume of the container is an actual volume of the container.

7. The method of claim 1, wherein the determined volume of the container is a measurement of a maximum amount of substance that the container is capable of holding.

* * * * *